(12) United States Patent
Junkers et al.

(10) Patent No.: US 11,035,512 B2
(45) Date of Patent: Jun. 15, 2021

(54) APPARATUS FOR TIGHTENING THREADED FASTENERS

(75) Inventors: John K. Junkers, Saddle River, NJ (US); Calvin A. Bonas, Bronx, NJ (US)

(73) Assignee: HYTORC Division UNEX Corporation, Mahwah, NJ (US)

( * ) Notice: Subject to any disclaimer, the term of this patent is extended or adjusted under 35 U.S.C. 154(b) by 211 days.

(21) Appl. No.: 14/241,531

(22) PCT Filed: Aug. 30, 2012

(86) PCT No.: PCT/US2012/053178
§ 371 (c)(1),
(2), (4) Date: Feb. 27, 2014

(87) PCT Pub. No.: WO2013/033423
PCT Pub. Date: Mar. 7, 2013

(65) Prior Publication Data
US 2014/0230608 A1    Aug. 21, 2014

Related U.S. Application Data

(60) Provisional application No. 61/528,814, filed on Aug. 30, 2011.

(51) Int. Cl.
*F16L 39/00* (2006.01)
*B25B 21/00* (2006.01)
(Continued)

(52) U.S. Cl.
CPC .............. *F16L 39/00* (2013.01); *B25B 21/00* (2013.01); *B25B 21/005* (2013.01); *F16L 27/093* (2013.01); *F16L 39/04* (2013.01)

(58) Field of Classification Search
CPC .............................................. Y10T 137/86268
(Continued)

(56) References Cited

U.S. PATENT DOCUMENTS 4,823,835 A * 4/1989 Chu .................... F16K 27/0281
137/557
6,089,265 A * 7/2000 Wang ..................... B25B 21/00
137/580
(Continued)

FOREIGN PATENT DOCUMENTS

WO    WO 2009/010807 A1    1/2009

*Primary Examiner* — Robert K Arundale
(74) *Attorney, Agent, or Firm* — Justin B. Bender, Esq.

(57) ABSTRACT

Apparatus for supplying a fluid to a device for tightening or loosening fasteners including a first fluid-transmitting element (130) having a first axis connectable with a housing of the device; a second fluid-transmitting element (140) rotatably connectable with the first element (130) about a second axis substantially perpendicular to the first axis; a third fluid-transmitting element (150) rotatably connectable with the second element (140) about a third axis substantially perpendicular to the second axis and connectable with a fluid-transmitting line; and first and second fluid conduits that transfer fluid to and from the device and the fluid-transmitting line through the first, second and third elements. The first element is rotatable 360° about the first axis; the second element is rotatable 360° about the second axis; and the third element is rotatable less than 360° about the third axis.

20 Claims, 3 Drawing Sheets

(51) Int. Cl.
*F16L 39/04* (2006.01)
*F16L 27/093* (2006.01)

(58) Field of Classification Search
USPC ...................................... 285/147.1; 81/57.39
See application file for complete search history.

(56) References Cited

U.S. PATENT DOCUMENTS

| | | | | |
|---|---|---|---|---|
| 6,598,502 | B1* | 7/2003 | Rosa | B25B 21/005 |
| | | | | 137/580 |
| 7,765,895 | B2* | 8/2010 | Junkers | B25B 23/0078 |
| | | | | 81/473 |
| 2001/0039858 | A1* | 11/2001 | Junkers | B25B 21/002 |
| | | | | 81/57.39 |
| 2002/0073808 | A1* | 6/2002 | Jamra | B25B 21/005 |
| | | | | 81/57.39 |
| 2002/0121161 | A1* | 9/2002 | Koppenhoefer | B25B 21/005 |
| | | | | 81/57.39 |
| 2009/0018004 | A1* | 1/2009 | Verfaellie | D21G 1/0226 |
| | | | | 492/49 |
| 2009/0083953 | A1* | 4/2009 | Kim | C23C 16/4409 |
| | | | | 24/460 |
| 2009/0107307 | A1* | 4/2009 | Fu | A01B 1/227 |
| | | | | 81/492 |
| 2012/0230757 | A1* | 9/2012 | Amikura | F16B 39/101 |
| | | | | 403/286 |

* cited by examiner

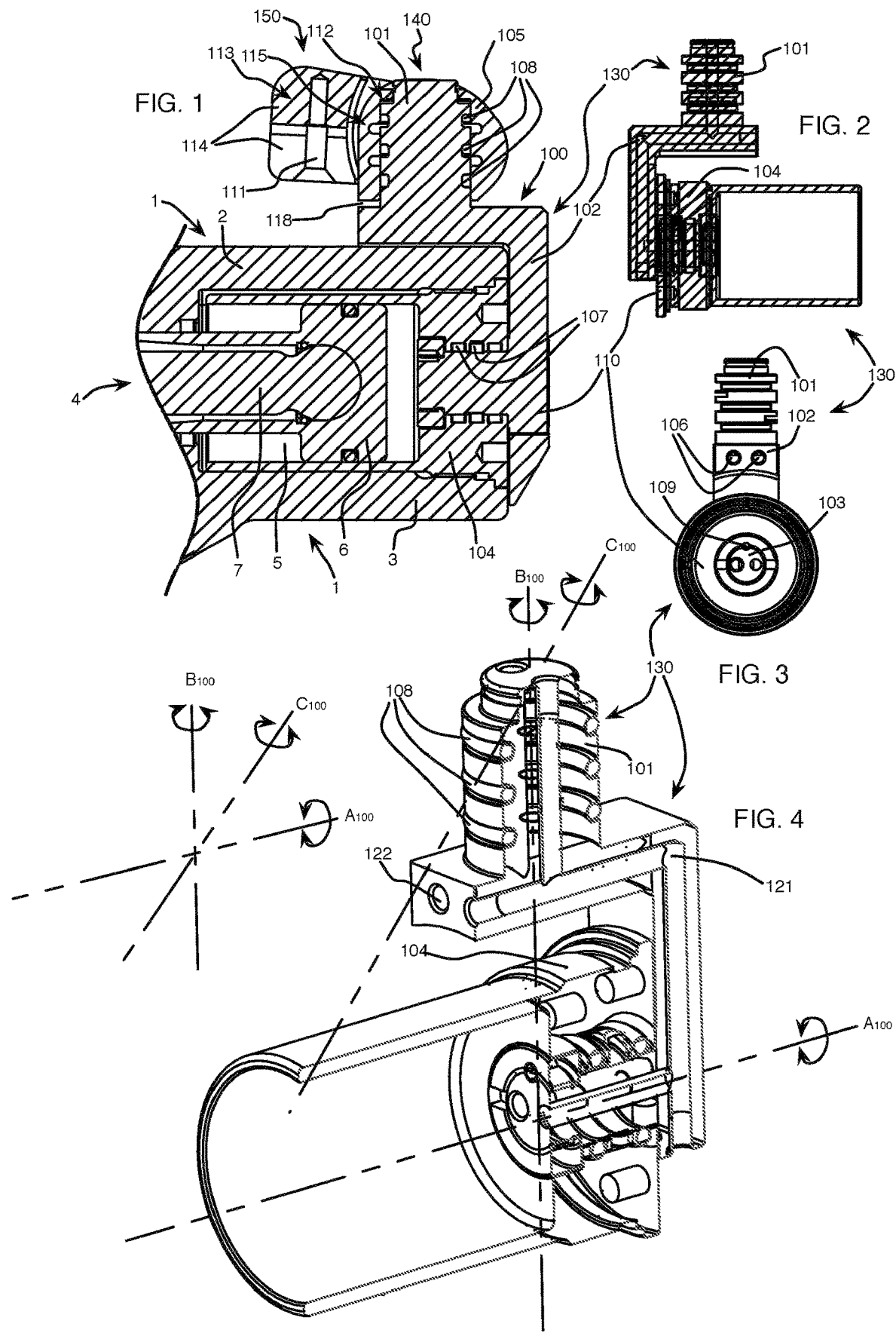

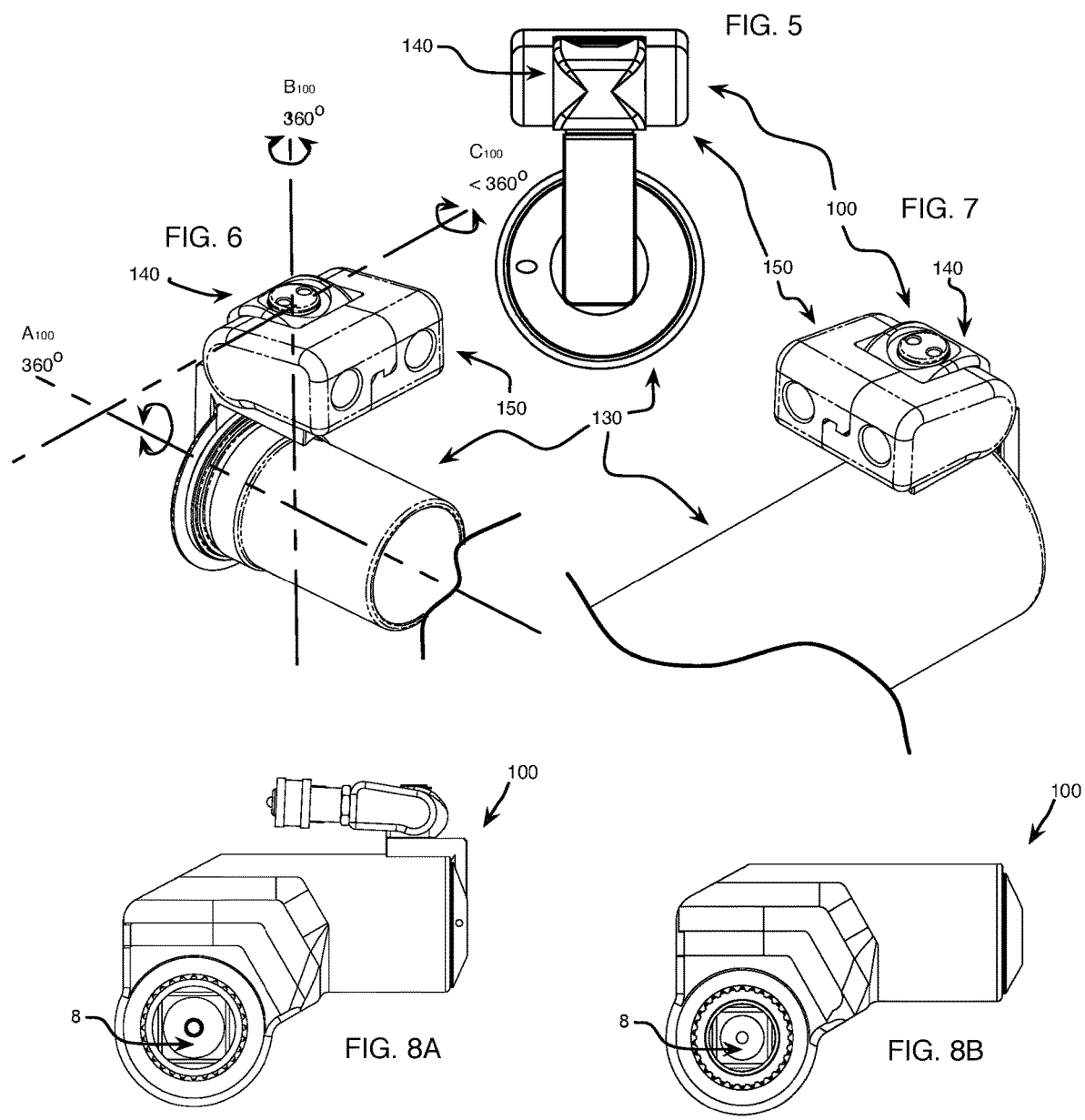

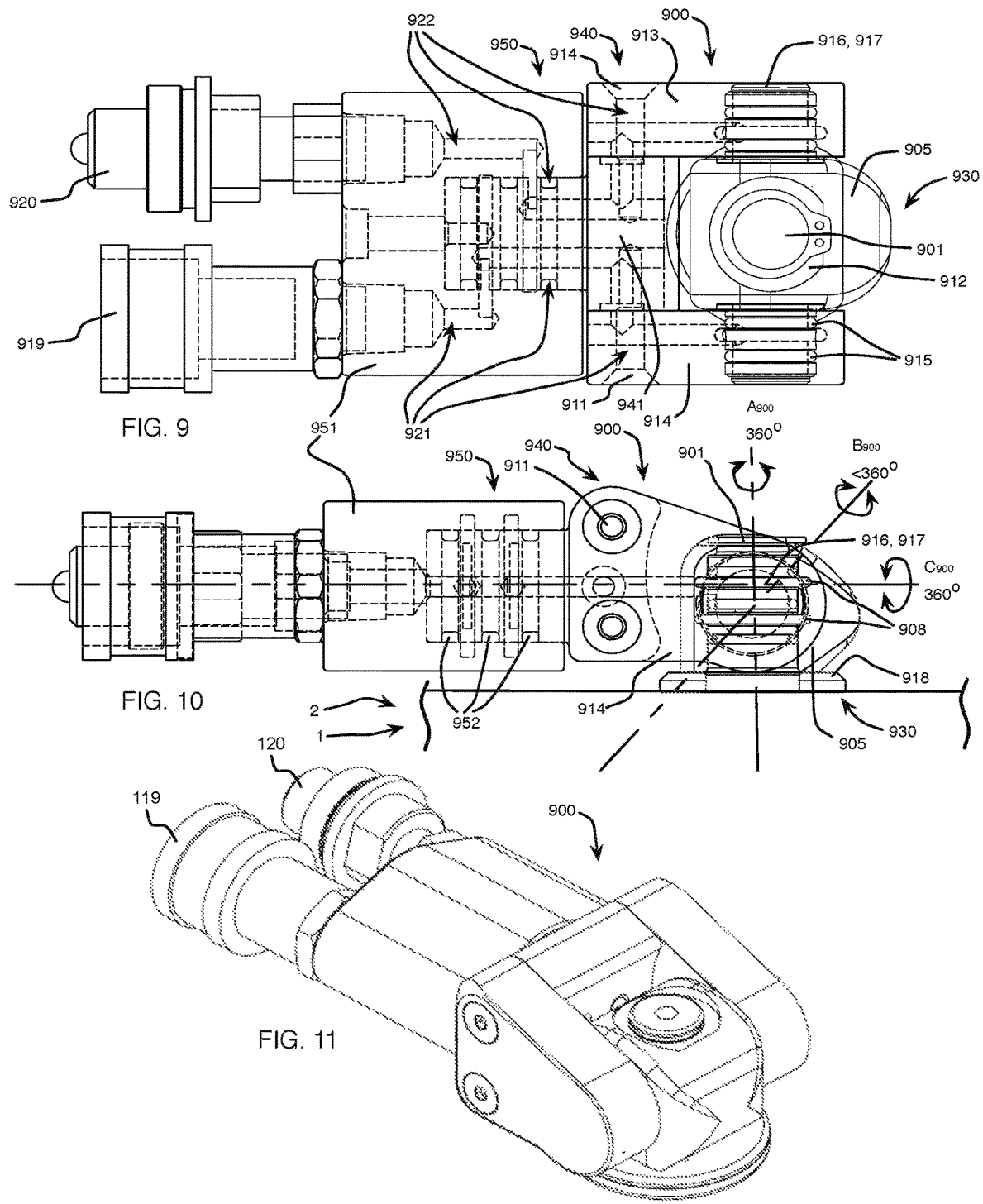

APPARATUS FOR TIGHTENING THREADED FASTENERS

CROSS REFERENCE TO RELATED PATENTS

This application is a continuation application of U.S. Application Ser. No. 61/528,814, having the Filing Date of 30 Aug. 2011, is entitled "APPARATUS FOR TIGHTENING THREADED FASTENERS", an entire copy of which is incorporated herein by reference.

Innovations disclosed in this application advance technology disclosed in the following commonly owned issued patents, entire copies of which are incorporated herein by reference: U.S. Pat. No. 4,921,010, having Issue Date of May 1, 1990, entitled "Swivel Connector"; U.S. Pat. No. 4,961,445, having Issue Date of Oct. 9, 1990, entitled "Connecting Device for Connecting Liquid Consumer to Liquid Source"; U.S. Pat. No. 5,311,796, having Issue Date of May 17, 1994, entitled "Hydraulic Tool"; U.S. Pat. No. 6,089,265, having Issue Date of Jul. 18, 2000, entitled "Multi-Swivel Connector for Connecting a Fluid Operated Tool to a Source of Fluid".

DESCRIPTION OF INVENTION

The present invention relates to swivel connectors for supplying a fluid to a consumer, for example, for supplying a hydraulic or pneumatic fluid to fluid-operated tools.

Known swivel connectors assist in maintaining kink-free fluid hoses between a fluid-operated tool and a fluid power source. Such swivel connectors can be turned 360° around the tool housing and about 180° perpendicular to the tool housing. Hose lengths between such tools and their sources vary and may exceed 100 feet. During operation of such tools, hydraulic and pneumatic fluids may exert pressures between 10,000 psi and 30,000 psi, which stiffen the fluid hoses. To accommodate such high pressures, diameters of hydraulic and pneumatic fluid hoses are typically large. When such fluid hoses tangle during tool operation, the tool becomes difficult to maneuver and position. Often tools weigh in excess of 100 lbs. and simply turning the tool to straighten out the hoses is difficult if not impractical.

The present invention has therefore been devised to address these issues.

According to a first aspect of the invention we provide an apparatus for supplying a fluid to a device for tightening or loosening fasteners including:
  a first fluid-transmitting element having a first axis connectable with a housing of the device;
  a second fluid-transmitting element rotatably connectable with the first element about a second axis substantially perpendicular to the first axis;
  a third fluid-transmitting element rotatably connectable with the second element about a third axis substantially perpendicular to the second axis and connectable with a fluid-transmitting line; and
  first and second fluid conduits that transfer fluid to and from the device and the fluid-transmitting line through the first, second and third elements.

Advantageously, if the apparatus is attached to a reaction portion of the tool, the first element is rotatable 360° about the first axis; the second element is rotatable 360° about the second axis; and the third element is rotatable less than 360° about the third axis. The apparatus allows for freedom of movement of the tool, the apparatus and/or the fluid-transmitting lines to avoid any portion of the tool, the apparatus and/or the fluid-transmitting lines from interfering with a fastener tightening or loosening application. It avoids increasing the dimensions of the tool relative to the fastener tightening or loosening application. The apparatus is positionable such that it is not visible when an operator views the tool. And operators can easily untangle the fluid-transmitting lines during tool operation.

The invention may be described, by way of example only, with reference to the accompanying drawings, of which:

FIG. 1 is a cross-section view showing a swivel connector assembly attached with a reaction portion of the tool housing and a tool piston assembly;

FIG. 2 is a cross-section view showing internal parts of portions of the swivel connector assembly;

FIG. 3 is a front view of FIG. 2;

FIG. 4 is a perspective cross-section view of FIGS. 2 and 3;

FIG. 5 is a perspective view of the swivel connector assembly;

FIG. 6 is a front view of the swivel connector assembly attached with the reaction portion of the tool housing;

FIG. 7 is a perspective view of FIG. 6;

FIG. 8A is a side view of FIGS. 6 and 7;

FIG. 8B is a side view of the tool with the swivel connector assembly rotated 90°;

FIG. 9 is a side view showing internal parts of another swivel connector assembly attached with a side portion of the tool housing;

FIG. 10 is a top view showing internal parts of FIG. 9; and

FIG. 11 is a perspective view of the another swivel connector assembly of FIG. 9.

Referring to FIGS. 1-8B by way of example, these show a swivel connector assembly 100 attachable with a reaction support portion 3 of a housing 2 of a tool 1 for tightening or loosening threaded fasteners and a cylinder-piston assembly 4.

Tool 1, portions of which are not shown in FIGS. 1-7, includes a housing 2 having two housing, portions, a cylinder portion and a driving, portion. Cylinder-piston assembly 4 is arranged in the cylinder portion and includes a cylinder 5, a piston 6 reciprocatingly movable in cylinder 5 along a piston, or first axis $A_{100}$, and a piston rod 7 connected with piston 6. Not shown, a known lever-type ratchet mechanism is arranged in the driving portion, connected to and drivable by cylinder-piston assembly 4, and includes a ratchet. The ratchet is turnable about a turning force axis, which is perpendicular to piston axis $A_{100}$. The ratchet is connected with a driving element, which receives a first turning force acting about the turning force axis in one direction during operation of tool 1. First turning force turns a deep well hex socket Reaction support portion 3, formed on a part of the cylinder portion, receives a second turning, or reaction, force acting about the turning force axis in another direction during operation of tool 1. Reaction support portion 3 is formed of an annular body about piston axis $A_{100}$. Note that any known fluid operated tool for tightening or loosening threaded fasteners having any known components may be substituted for tool 1.

Swivel connector assembly 100 supplies an hydraulic fluid to tool 1 and includes: a first fluid-transmitting element 130 rotatably connectable with housing 2 about first axis $A_{100}$; a second fluid-transmitting element 140 rotatably connectable with first fluid-transmitting element 130 about a second axis $B_{100}$ substantially perpendicular to first axis $A_{100}$; and a third fluid-transmitting element 150 rotatably connectable with second fluid-transmitting element 140 about a third axis $C_{100}$ substantially perpendicular to second axis $B_{100}$ and connectable with a fluid-transmitting line(s)

(not shown). Shown more clearly in FIGS. 2 and 4, a first and a second fluid conduit 121 and 122 transfer fluid to and from tool 100 and the fluid-transmitting line through first, second and third fluid-transmitting elements 130, 140 and 150. Note that first axis $A_{100}$ is substantially parallel to an outer surface of housing 2.

Swivel connector assembly 100 includes the following component parts. First fluid-transmitting element 130 includes: a swivel connector assembly end cap 104; a swivel connector assembly bracket 102; a swivel connector assembly post 101; and a swivel connector assembly end cap cover 110. Swivel connector assembly 100 is connected to tool 1 by: a swivel connector assembly retaining nut 103; swivel connector assembly bracket set screws 106; swivel/piston o-rings 107; and a swivel connector assembly lock screw 109.

Second fluid-transmitting element 140 includes a swivel connector assembly joint block 105. Second fluid-transmitting element 140 is connected to first fluid-transmitting element 130 by: swivel block/bracket o-rings 108; a swivel block/bracket post retaining ring 112; and a swivel block/bracket post washer 118.

Third fluid-transmitting element 150 includes: a swivel yoke 113 with bottom and top swivel yoke portions 114; and female and male swivel yoke fluid couplers (shown in FIG. 8A). Third fluid-transmitting element 150 is connected to second fluid-transmitting element 140 by: swivel yoke/block o-rings 115; swivel yoke flush sockets 116; and swivel yoke pressure plugs 117. Swivel yoke 113 is held together by yoke screw 111.

Alternatively either end cap 104, end cap cover 110 or both may not be part of first fluid-transmitting element 130 of swivel connector assembly 100 and may be formed as part of tool 1. Alternatively either end cap 104, end cap cover 110 or both may be formed as an additional fluid-transmitting element, in this case, a fourth fluid-transmitting element. Note that any part of swivel connector assembly 100 generally and fluid-transmitting elements 130, 140 or 150 specifically may be formed as part of either a different fluid-transmitting element or tool 100.

Referring to FIG. 8A by way of example, this shows tool 1 with swivel connector assembly 100 in an upward position. Referring to FIG. 8B by way of example, this shows tool 1 with swivel connector assembly 100 rotated 90° into the page in a clockwise direction relative to the position of FIG. 8A. Swivel connector assembly 100 is positionable such that it is not visible when an operator views tool 1 from an opposite side.

Advantageously first fluid-transmitting element 130 is rotatable 360° about first axis $A_{100}$; second fluid-transmitting element 140 is rotatable 360° about second axis. $B_{100}$; and third fluid-transmitting element is rotatable less than 360° about third axis $B_{100}$. Swivel connector assembly 100 allows for freedom of movement of tool 1, swivel connector assembly 100 and/or the fluid-transmitting lines to avoid any portion of such from interfering with a fastener tightening or loosening application. It avoids increasing the dimensions of tool 1 relative to the fastener tightening or loosening application. Swivel connector assembly 100 is positionable such that it is not visible when an operator views tool 1 from an opposite side. And the operator can easily untangle the fluid-transmitting lines during operation of tool 1.

Referring to FIGS. 9-11 by way of example, these show another swivel connector assembly 900 attachable with a side of housing 2 of tool 1 by a primary swivel connector assembly post 901. Generally discussion related to FIGS. 1-8B apply to FIGS. 9-11.

Swivel connector assembly 900 supplies an hydraulic fluid to tool 1 and includes: a first fluid-transmitting element 930 rotatably connectable with primary swivel connector assembly post 901 about first axis $A_{900}$; a second fluid-transmitting element 940 rotatably connectable with first fluid-transmitting element 930 about a second axis $B_{900}$ substantially perpendicular to first axis $A_{900}$; and a third fluid-transmitting element 950 rotatably connectable with second fluid-transmitting element 940 about a third axis $C_{900}$ substantially perpendicular to second axis $B_{900}$ and connectable with a fluid-transmitting line(s) (not shown). A first and a second fluid conduit 921 and 922 transfer fluid to and from tool 1 and the fluid-transmitting lines through first, second and third fluid-transmitting elements 930, 940 and 950. Note that first axis $A_{900}$ is substantially perpendicular to the outer surface of housing 2.

Primary swivel connector assembly post 901 is connected to the outer surface of housing 2 of tool 1 by: primary swivel connector assembly post sealing o-rings 907; and primary swivel connector assembly post lock screws 909.

First fluid-transmitting element 930 includes a primary swivel connector assembly joint block 905. First fluid-transmitting element 930 is connected to primary swivel connector assembly post 901 by: swivel block/bracket o-rings 908; a swivel block/bracket post retaining ring 912; and a swivel block/bracket post washer 918.

Second fluid-transmitting element 940 includes a secondary swivel connector assembly post 941 formed between a swivel yoke 913 with bottom and top swivel yoke portions 914. Second fluid-transmitting element 940 is connected to first fluid-transmitting element 930 by: swivel yoke/block o-rings 915; swivel yoke flush sockets 916; and swivel yoke pressure plugs 917. Yoke screws 911 hold swivel yoke portions 914 and secondary assembly post 941 together.

Third fluid-transmitting element 950 includes: a secondary swivel connector assembly joint block 951 and female and male swivel yoke fluid couplers 919 and 920. Third fluid-transmitting element 950 is connected to second fluid-transmitting element 940 by insertion of secondary swivel connector assembly post 941 into secondary swivel connector assembly joint block 951 and sealed with swivel yoke/block o-rings 952.

Alternatively primary swivel connector assembly post 901 may be part of first fluid-transmitting element 930 of swivel connector assembly 900. Alternatively primary swivel connector assembly post 901 may be formed as an additional fluid-transmitting element, in this case, a fourth fluid-transmitting element. Note that any part of swivel connector assembly 900 generally and fluid-transmitting elements 930, 940 or 950 specifically may be formed as part of either a different fluid-transmitting element or tool 1.

Advantageously first fluid-transmitting element 930 is rotatable 360° about first axis $A_{900}$; second fluid-transmitting element 140 is rotatable 360° about second axis $B_{100}$; and third fluid-transmitting element is rotatable less than 360° about third axis $C_{100}$ (as limited by housing 2). Swivel connector assembly 100 allows for freedom of movement of tool 1, swivel connector assembly 100 and/or the fluid-transmitting lines to avoid any portion of such from interfering with a fastener tightening or loosening application. It avoids increasing the dimensions of tool 1 relative to the fastener tightening or loosening application. Swivel connector assembly 100 is positionable such that it is not visible when an operator views tool 1 from an opposite side. And the operator can easily untangle the fluid-transmitting lines during tool 1 operation.

Note that portions of swivel connector assembly 900, for example second and third fluid-transmitting elements 940 and 950, may be substituted for or added to portions of swivel connector assembly 100, for example third fluid-transmitting elements 140 and 150. In this case swivel connector assembly 100 would include a fourth fluid-transmitting element rotatable 360° about a fourth axis, substantially perpendicular to third axis $C_{100}$.

Note that first, second, third and/or fourth fluid-transmitting elements may be limited to rotate less than or allowed to rotate more than that which is stated. Note that first, second, third and/or fourth fluid-transmitting elements may rotatable at angle intervals, for example every 30°, 45°, 60°, 90° and/or 180°, and/or allowed to rotate continuously. Note that first, second, third (and/or fourth) axes may be more or less than substantially perpendicular to each other.

Note that first and second fluid conduits 121 and/or 921 and/or 122 and/or 922 may incorporate any known components, geometries and/or characteristics, particularly as discussed in the patents mentioned in the above section Cross Reference to Related Patents, entire copies of which are incorporated herein by reference.

Note that tool 1 and/or swivel connector assembly 100 and/or 900 may incorporate any known components, geometries and/or characteristics, particularly as discussed in the patents mentioned in the above section Cross Reference to Related Patents, entire copies of which are incorporated herein by reference.

It will be understood that each of the elements described above, or two or more together, may also find a useful application in other types of constructions differing from the types described above. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

While the invention has been illustrated and described as embodied in a fluid operated tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

When used in this specification and claims, the terms "comprising", "including", "having" and variations thereof mean that the specified features, steps or integers are included. The terms are not to be interpreted to exclude the presence of other features, steps or components.

What is claimed is:

1. An apparatus for supplying a fluid to a device for tightening or loosening fasteners including:
   a first fluid-transmitting element rotatably connectable with a cylinder portion of a housing of the device 360° about a first axis;
   a second fluid-transmitting element rotatably connectable with the first element 360° about a second axis;
   a third fluid-transmitting element rotatably connectable with the second element less than 360° about a third axis and connectable with a fluid-transmitting line;
   first and second fluid conduits that transfer fluid to and from the device and the fluid-transmitting line through the first, second and third elements; and
   wherein the device turns a deep well socket rotatably connectable about a driving portion of the housing.

2. An apparatus according to claim 1 including:
   wherein the second axis is substantially perpendicular to the first axis; and
   wherein the third axis is substantially perpendicular to the second axis.

3. An apparatus according to claim 1 wherein the first axis is substantially parallel to an outer surface of the cylinder portion of the device housing.

4. An apparatus according to claim 1 wherein the apparatus is positionable such that it avoids contact with any unintended portion of the device and/or the fluid-transmitting lines and interference with a fastener tightening or loosening application.

5. An apparatus according to claim 1 wherein the apparatus is positionable such that it avoids increasing the dimensions of the device relative to a fastener tightening or loosening application.

6. An apparatus according to claim 1 wherein the apparatus is positionable such that it is hidden from view from a specific perspective.

7. An apparatus according to claim 1 including:
   the first element is connectable with either a side of the device housing or a reaction support portion of the device housing;
   a fourth fluid-transmitting element rotatably connectable with the third element about a fourth axis substantially perpendicular to the third axis and connectable with a fluid-transmitting line; and
   wherein first and second fluid conduits that transfer fluid to and from the device and the fluid-transmitting line through the first, second, third and fourth elements.

8. An apparatus according to claim 7 wherein the fourth axis is substantially perpendicular to the third axis.

9. An apparatus according to claim 8 wherein the fourth element is rotatable 360° about the fourth axis.

10. An apparatus according to claim 9 wherein the apparatus allows for freedom of movement of the device, the apparatus and/or the fluid-transmitting lines to avoid any portion of the device, the apparatus and/or the fluid-transmitting lines from interfering with a fastener tightening or loosening application.

11. An apparatus according to claim 9 wherein the apparatus avoids increasing the dimensions of the device relative to a fastener tightening or loosening application.

12. An apparatus according to claim 9 wherein the apparatus is positionable such that it is not visible when an operator views the device.

13. An apparatus according to claim 1 wherein the first element is connectable with the side of the device housing and the first axis is substantially perpendicular to an outer surface of the device housing.

14. An apparatus according to claim 13 wherein:
   the first element is rotatable 360° about the first axis;
   the second element is rotatable less than 360° about the second axis; and
   the third element is rotatable 360° about the third axis.

15. An apparatus according to claim 14 wherein the apparatus allows for freedom of movement of the device, the apparatus and/or the fluid-transmitting lines to avoid any portion of the device, the apparatus and/or the fluid-transmitting lines from interfering with a fastener tightening or loosening application.

16. An apparatus according to claim 14 wherein the apparatus avoids increasing the dimensions of the device relative to a fastener tightening or loosening application.

17. An apparatus according to claim 14 wherein the apparatus is positionable such that it is not visible when an operator views the device.

18. An apparatus according to claim 1 wherein: the first element is attachable separately, individually and independently to the device housing; the second element is attachable separately, individually and independently to the first element; and the third element is attachable separately, individually and independently to the second element.

19. An apparatus according to claim 1 wherein the device is either pneumatically or hydraulically driven.

20. A device for tightening or loosening fasteners having an apparatus for supplying a fluid to the device according to either claim 1, 2, 3, 4, 5, 6, 18 or 19.

* * * * *